June 24, 1952 R. E. CHAPMAN 2,601,366
CIRCULAR-SAW STUMP-CUTTING ATTACHMENT FOR TRACTORS
Filed June 9, 1950 2 SHEETS—SHEET 1
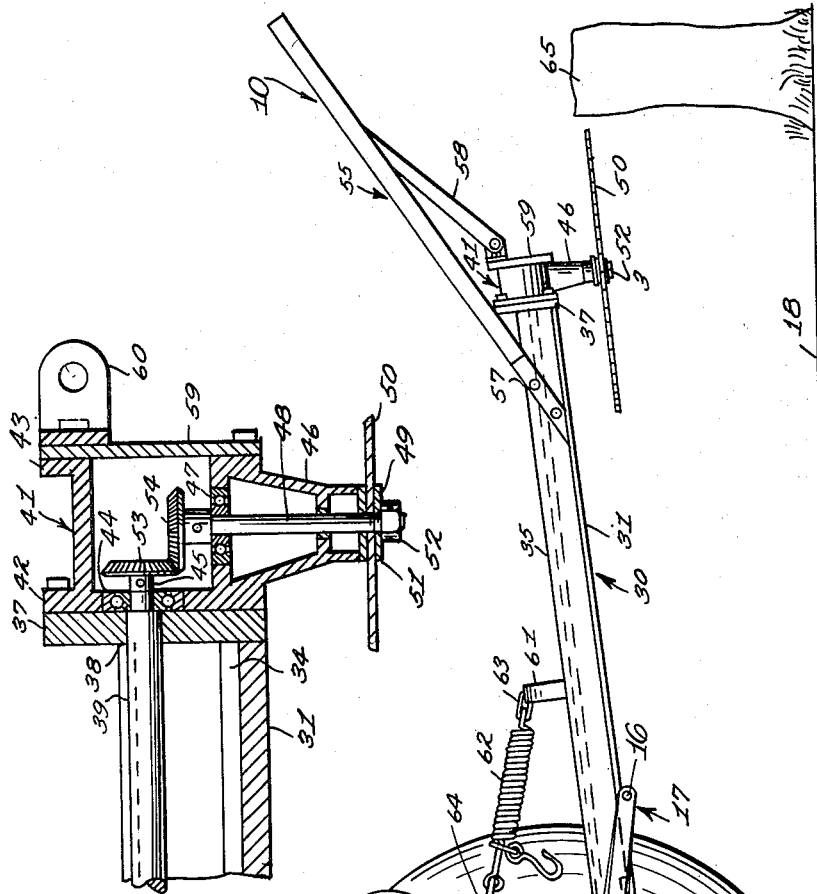
INVENTOR.
REUBEN E. CHAPMAN
BY
McMorrow, Berman + Davidson
ATTORNEYS June 24, 1952     R. E. CHAPMAN     2,601,366
CIRCULAR-SAW STUMP-CUTTING ATTACHMENT FOR TRACTORS
Filed June 9, 1950     2 SHEETS—SHEET 2
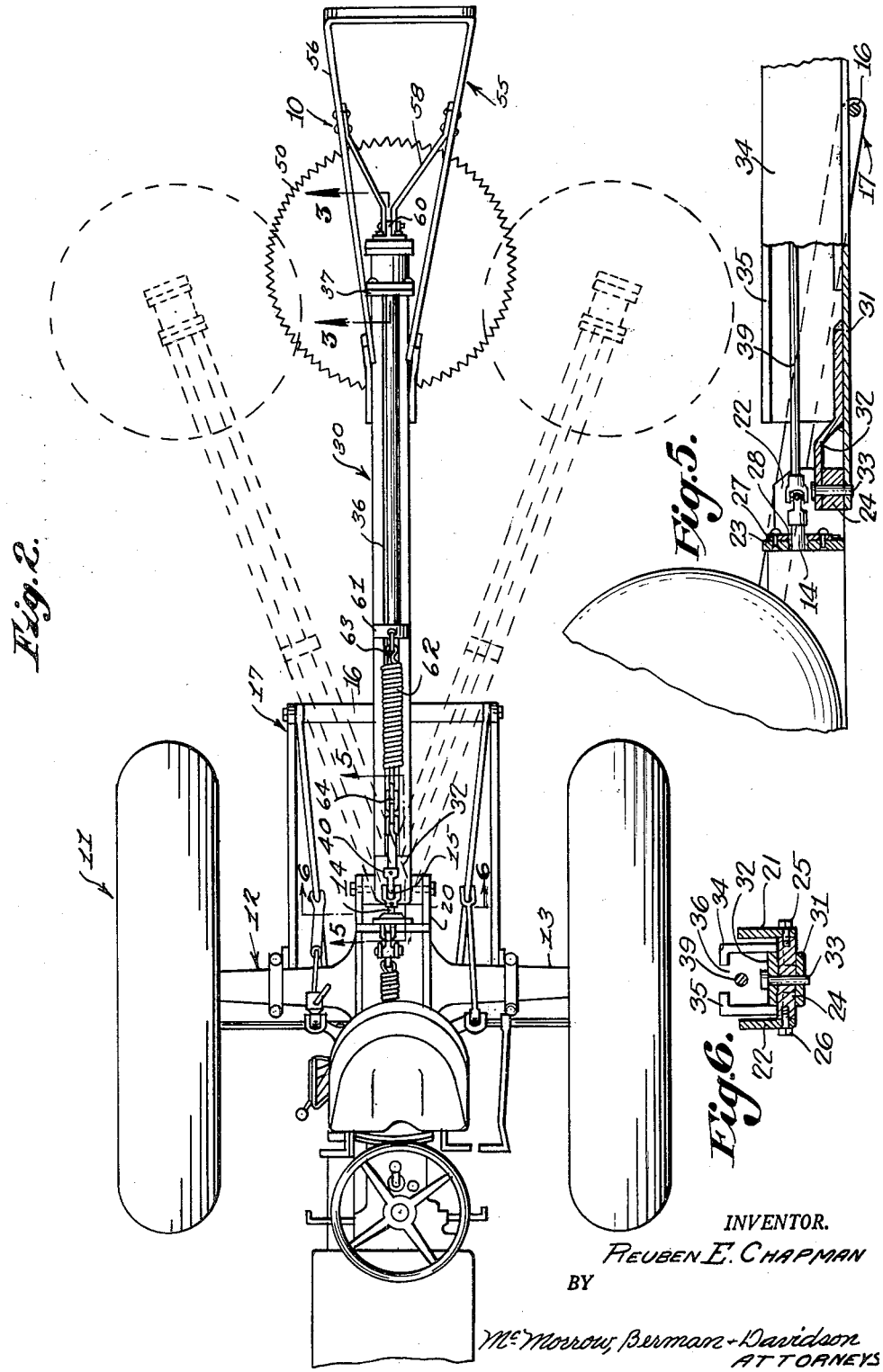
INVENTOR.
REUBEN E. CHAPMAN
BY
McMorrow, Berman + Davidson
ATTORNEYS Patented June 24, 1952

2,601,366

UNITED STATES PATENT OFFICE 2,601,366

CIRCULAR-SAW STUMP-CUTTING ATTACHMENT FOR TRACTORS

Reuben E. Chapman, Tillar, Ark.

Application June 9, 1950, Serial No. 167,133

2 Claims. (Cl. 143—43)

This invention relates to a cutting attachment for a tractor.

An object of this invention is to provide an attachment for a tractor which is particularly adapted for cutting tree stumps.

Another object of this invention is to provide a cutting attachment for a tractor which is particularly adapted for clearing land to be cultivated, wherein it is necessary to cut away the visible portions of tree stumps prior to cultivation.

A further object of this invention is to provide a cutting attachment which is particularly adapted to be operatively connected to the power take-off of a tractor.

A still further object of this invention is to provide a cutting attachment for a tractor which is simple in structure and cheap to manufacture.

The above and still further objects and advantages of the invention will become apparent upon a consideration of the following detailed description, when taken in conjunction with the accompanying drawings, wherein:

Figure 1 is a side elevational view of the cutting attachment of the present invention shown assembled with a tractor in position to cut a tree stump;

Figure 2 is a top plan view of the cutting attachment of the present invention shown in Figure 1;

Figure 3 is an enlarged fragmentary sectional view taken along the line 3—3 of Figure 2; and Figure 4 is an enlarged perspective view of the hitch for securing the cutting attachment to the tractor.

Figure 5 is an enlarged fragmentary sectional view taken along the line 5—5 of Figure 2.

Figure 6 is an enlarged fragmentary sectional view taken along the line 6—6 of Figure 2.

Referring now more particularly to the drawings, wherein like reference numerals have been used throughout the several views to designate like parts, there is shown the cutting attachment of the present invention, generally designated by the reference numeral 10, supported on a tractor 11 of the Ford, Ford-Ferguson, or Ferguson types. The tractor 11 embodies a frame 12 carrying an axle housing 13 which is provided with a rearwardly extending power take-off shaft 14, the shaft including a splined end 15 for attachment to drive power-driven equipment. Disposed longitudinally of and rearwardly of the frame 12 of the tractor 11 contiguous to the power take-off 14 is a hydraulically actuated drawbar which is connected at one end to the frame 12 for up and down movement toward and away from a ground surface 18, the drawbar having a crossbar 16 at the other end and being designated by the reference numeral 17.

The attachment 10 includes a hitch 20, Figure 4, which embodies spaced, vertically disposed side walls 21, 22, and an end wall 23 extending between the side walls and fixedly secured thereto, and a base plate 24 extending between the side walls 21, 22 contiguous to the lower ends thereof and pivotally supported thereon by means of the transversely extending bolts 25, 26 which are loosely received and supported within the adjacent ends of the base plate 24. The end wall 23 is provided with a reinforcing collar 27 disposed in confronting relation therewith and secured thereto. Disposed centrally of the reinforcing collar 27 there is provided an aperture 28 which extends through the end wall 23. At spaced intervals about the reinforcing collar 27, the end wall 23 is provided with bolt-receiving apertures, generally designated by the reference numeral 29, for fixedly securing the hitch 20 to the axle housing 13 with the power takeoff shaft 14 extending through the opening 28.

Positioned longitudinally of the drawbar 17 and resting upon the crossbar 16 of the drawbar is a support 30, the support having one end connected to the base plate 24 of the hitch 20 for swinging movement about a vertical axis. The support includes a supporting plate 31 which has one end positioned below the base plate 24. Spaced above said one end of the supporting plate 31 and supported on the latter is an arm 32 which overlies the base plate 24. Extending transversely through the superimposed portions of the supporting plate 31, the base plate 24 and the arm 32 is a bolt 33 which provides the pivotal axis for the elongated support 30. Accordingly, the support 30 is connected to the hitch 20 for pivotal movement in a vertical plane toward and away from the ground surface 18 about the bolts 25, 26 as a pivotal axis, and for swinging movement in select positions of the pivotal movement about the bolt 33.

Extending longitudinally of the supporting plate 31 and fixedly secured thereto is a U-shaped channel 34 which has its legs facing inwardly of the supporting plate 31. Disposed in face-to-face and spaced relation with respect to the U-shaped channel 34 is a second U-shaped channel 35 which is likewise fixedly secured to the supporting plate 31. The supporting plate 31 and the U-shaped channel 34, 35 cooperate to form the elongated support 30 which is open at its ends and provided with a longitudinally extending slot 36 in the open top thereof.

Fixedly secured to the end of the support 30 remote from the power take-off is an end wall 37 provided with an aperture 38 extending transversely therethrough. Disposed longitudinally within the elongated support 30 is a driven shaft 39 which has one end operatively connected to the power take-off shaft 14 by means of a universal joint 40 which is operatively connected to the splined end 15 of the power take-off shaft. The other end of the driven shaft 39 is received within the aperture 38 of the end wall 37.

Disposed in end-to-end, aligned relation with respect to the support 30 and fixedly secured to the end wall 37 thereof is an open-ended, cylindrical sleeve 41 which includes flanged ends 42, 43. Supported within the open end of the sleeve 41 contiguous to the end wall 37 is a bearing 44 which rotatably journals a stub shaft 45 carried by the adjacent end of the driven shaft 39, the stub shaft 45 projecting into the sleeve 41.

As clearly shown in Figure 3, the cylindrical sleeve 41 is provided with a depending housing 46 which has one end fixedly secured to the periphery of the cylindrical sleeve 41 and has its other end terminating adjacent to and spaced from the latter. The peripheral wall of the cylindrical sleeve 41 contiguous to the depending housing 46 is provided with a bearing 47 which rotatably journals a shaft 48 which has one end extending into the cylindrical sleeve 41 and has its other end extending through and projecting beyond the terminating end of the housing 46. The projecting end of the shaft 48 contiguous to the terminating end of the housing 46 is threaded, as indicated by the reference numeral 49, and supports a circular cutter blade 50, the blade being supported by means of a washer 51 and a nut 52 threadedly engaging the threaded portion 49 of the shaft 48.

Fixedly secured to the end of the stub shaft 45 within the cylindrical sleeve 41 is a first bevel gear 53. Fixedly secured to the end of the shaft 48 and extending into the cylindrical sleeve 41 is a second bevel gear 54 which is in meshing engagement with respect to the first-named bevel gear. Accordingly, an operative connection is effected between the driven shaft 39 and the shaft 48.

Extending upwardly and rearwardly of the support 30 and fixedly secured thereto is a handle, generally designated by the reference numeral 55. The handle 55 embodies a U-shaped arm 56 which has its legs fixedly secured to the opposite sides of the support 30 by means of the bolts designated by the reference numeral 57. Dependingly supported from the legs of the U-shaped handle 55 is a reinforcing strut 58 which has its lower end operatively connected to the sleeve 41 by means of a cover plate 59 which is detachably secured across the other open end of the sleeve 41, the cover plate being provided with an extending dog 60.

Extending transversely of the support 30 intermediate the ends thereof and fixedly secured thereto is a bracket 61 which supports a spring 62 by means of a link 63 having one end supported in the bracket 61 and having the other end secured to one end of the spring 62. The other end of the spring 62 is operatively connected to the frame of the tractor by means of a chain 64. The spring 62 normally maintains the elongated support 30 at a select level with respect to the ground surface 18.

In actual use, the tractor 11 is brought into position contiguous to a stump to be cut, whereupon the hydraulically actuated drawbar 17 is brought out of its supported position beneath the support 30 to thereby permit the support 30 to be pivoted toward and away from the ground surface 18. The movement of the support 30 is effected by grasping the handle 55 and imparting a downward force to the attachment against the upwardly directed force applied by the spring 62. The support 30 is brought into position contiguous to one side of the trunk 65 to be cut, whereupon the clutch of the tractor is let out to put the power take-off shaft 14 into operation. It is to be noted that the gearing ratio between the bevel gears 53, 54 is selected so that the driven shaft 39 does not have to rotate at excessively high speed in effecting the rotation of the cutter blade 50. By manually grasping the handle 55, it is possible to rock the entire attachment about the pivotal axis extending transversely of the base plate 24 of the hitch 20, to thereby cut away the stump. If the stump is of such a size that the entire cutting operation cannot be effected from one side, it is merely necessary to withdraw the blade 50 from one side of the stump and re-apply the blade 50 to the opposite side thereof in substantial alignment with the previously-made cut. In this manner, very large stumps may be cut with speed and facility.

Numerous modifications of the cutting attachment of the present invention may be made without departing from the spirit of the invention as set forth in the appended claims.

What I claim is:

1. A cutting attachment for connection to a tractor including a frame, a power take off extending rearwardly of said frame, and a hydraulically actuated drawbar arranged longitudinaly of and rearwardly of said frame and connected at one end to said frame for up and down movement with respect to a ground surface and having a crossbar at the other end thereof, said attachment comprising an upstanding hitch arranged longitudinally of and contiguous to said take off and fixedly secured to the adjacent portion of said frame, said hitch including a pair of spaced vertically disposed side walls, an end wall extending between said side walls adjacent one end thereof and fixedly secured thereto, and a base plate positioned between the said side walls inwardly of the other end of the latter named walls and spaced from said end walls and connected intermediate its ends to said side walls for pivotal movement in a vertical plane toward and away from said ground surface, a support arranged longitudinally of said drawbar and resting upon the crossbar of said drawbar and having one end connected to the base plate of said hitch for swinging movement about a vertical axis, a driven shaft positioned longitudinally of and upon said support and having one extending through the end wall of said hitch and connected to said power take off, a vertically disposed driven shaft arranged adjacent the other end of said first named driven shaft and having one end connected to said other end of said latter named shaft for rotation therewith, and a horizontally disposed cutter blade connected to said vertically disposed driven shaft for rotation therewith.

2. A cutting attachment for connection to a tractor including a frame, a power take off extending rearwardly of said frame, and a hydraulically actuated drawbar arranged longitudinally of and rearwardly of said frame and connected at one end to said frame for up and down movement with respect to a ground surface and having a crossbar at the other end thereof, said attachment comprising an upstanding hitch arranged longitudinally of and contiguous to said take off and fixedly secured to the adjacent portion of said frame, said hitch including a pair of spaced vertically disposed side walls, an end wall extending between said side walls adjacent one end thereof and fixedly secured thereto, and a base plate positioned between said side walls inwardly of the other end of the latter named walls and spaced from said end wall and connected intermediate its ends to said walls for pivotal movement in a vertical plane toward and away from said ground surface, a support arranged longitudinally of said drawbar and resting upon the crossbar of said drawbar and having one end connected to the base plate of said hitch for swinging movement about a vertical axis, a driven shaft positioned longitudinally of and upon said support and having one end extending through the end wall of said hitch and connected to said power take off, a vertically disposed driven shaft arranged adjacent the other end of said first named driven shaft and having one end connected to said other end of the latter named shaft for rotation therewith, a horizontally disposed cutter blade connected to said vertically disposed driven shaft for rotation therewith, and resilient means operatively connected to said support intermediate its ends and to said frame for normally maintaining the support at a working level with respect to said ground surface.

REUBEN E. CHAPMAN.

REFERENCES CITED

The following references are of record in the file of this patent:

UNITED STATES PATENTS

| Number | Name | Date |
|---|---|---|
| 1,447,606 | Seymour | Mar. 6, 1923 |
| 1,798,402 | Dibble | Mar. 31, 1931 |
| 2,105,030 | Dunham | Jan. 11, 1938 |
| 2,350,880 | Dellinger et al. | June 6, 1944 |
| 2,435,192 | Arsneau | Feb. 3, 1948 |
| 2,439,607 | Irwin | Apr. 13, 1948 |
| 2,462,314 | Fuqua | Feb. 22, 1949 |